(12) United States Patent
Xun et al.

(10) Patent No.: US 9,727,394 B2
(45) Date of Patent: Aug. 8, 2017

(54) ESTABLISHING CAUSALITY ORDER OF COMPUTER TRACE RECORDS

(71) Applicant: Microsoft Technology Licensing, LLC, Redmond, WA (US)

(72) Inventors: Lu Xun, Redmond, WA (US); Gopala Krishna R. Kakivaya, Sammamish, WA (US); Mihail Gavril Tarta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/697,488

(22) Filed: Apr. 27, 2015

(65) Prior Publication Data
US 2016/0314026 A1    Oct. 27, 2016

(51) Int. Cl.
G06F 9/54    (2006.01)
G06F 11/34    (2006.01)

(52) U.S. Cl.
CPC .......... *G06F 9/542* (2013.01); *G06F 11/3466* (2013.01)

(58) Field of Classification Search
CPC .................................................. G06F 11/3404
See application file for complete search history.

(56) References Cited

U.S. PATENT DOCUMENTS

| 6,052,363 | A | 4/2000 | Koch |
| 6,807,583 | B2 | 10/2004 | Hrischuk et al. |
| 7,650,538 | B2 | 1/2010 | Bower et al. |
| 8,065,688 | B2 | 11/2011 | Melloul et al. |
| 8,364,829 | B2 | 1/2013 | Mogul et al. |
| 2002/0120734 | A1 | 8/2002 | Riosa et al. |
| 2002/0174415 | A1 | 11/2002 | Hines |
| 2005/0015424 | A1* | 1/2005 | Aguilera ................. H04L 41/00 709/200 |

(Continued)

FOREIGN PATENT DOCUMENTS

WO    2014008495 A2    1/2014

OTHER PUBLICATIONS

Fonseca, R.; Porter, G.; Katz, R..; Shenker, S.; Stoica, I., "X-Trace: A Pervasive Network Tracing Framework" (2007), Proceedings of 4$^{th}$ USENIX Symposium on Networked Systems Design & Implementation, pp. 271-284 [retrieved from https://www.usenix.org/legacy/events/nsdi07/tech/full_papers/fonseca/fonseca.pdf].*

(Continued)

*Primary Examiner* — Brian W Wathen

(57) ABSTRACT

Techniques are described herein that are capable of establishing causality order of computer trace records. A computer trace record is information that indicates an event that occurs with regard to execution of a computer program. For instance, machines in a distributed computer system may generate such computer trace records as the machines execute the computer program. The computer trace records may be ordered in an aggregated trace to accurately reflect the causality order of the computer trace records. A causality order of computer trace records is a temporal sequence of the computer trace records in which each cause event is indicated to occur before each effect event that is caused by the cause event. A cause event is an event that causes an effect event. An effect event is an event that is caused by a cause event.

17 Claims, 7 Drawing Sheets

(56) References Cited

U.S. PATENT DOCUMENTS

| | | | |
|---|---|---|---|
| 2005/0289230 A1 | 12/2005 | Chen et al. |
| 2011/0289301 A1 | 11/2011 | Allen et al. |
| 2014/0215443 A1 | 7/2014 | Voccio et al. |

OTHER PUBLICATIONS

Schwarz, R.; Mattern, F., "Detecting causal relationships in distributed computations: In search of the holy grail" (1994), Distributed Computing, vol. 7, Issue 3, pp. 149-174 [retrieved from http://link.springer.com/article/10.1007/BF02277859].*

Lamport, L., "Time, clocks, and the ordering of events in a distributed system" (1978), Communications of the ACM, vol. 21, Issue 7, pp. 558-565 [retrieved from http://dl.acm.org/citation.cfm?id=359563].*

Microsoft, "Introduction to Instrumentation and Tracing" (May 30, 2014), pp. 1-6 [retrieved from https://web.archive.org/web/20140530025236/http://msdn.microsoft.com/en-us/library/aa983649%28VS.71%29.aspx].*

Hendrickson, et al., "An (Architecture-centric) Approach for Tracing, Organizing, and Understanding Events in Event-based Software Architectures", In Proceedings of 13th International Workshop on Program Comprehension, May 15, 2005, 10 pages.

Sambasivan, et al., "So, you want to trace your Distributed System? Key Design Insights from years of Practical Experience", In Technical Report CMU-PDL-14-102, Apr. 2014, 25 pages.

Zhou, et al., "Tracking Adversarial Behavior in Distributed Systems with Secure Network Provenance", In Technical Report MS-CIS-10-28, Aug. 31, 2010, 6 pages.

Sigelman, et al., "Dapper, a Large-Scale Distributed Systems Tracing Infrastructure", In Google Technical Report dapper-2010-1, Apr. 2010, 14 pages.

Aguilera, et al., "Performance Debugging for Distributed Systems of Black Boxes", In Proceedings of the Nineteenth ACM symposium on Operating systems Principles, Oct. 9, 2003, pp. 74-89.

"International Search Report and Written Opinion Issued in PCT Application No. PCT/US2016/027527", Mailed Date: Jul. 18, 2016, 12 Pages.

* cited by examiner

ESTABLISHING CAUSALITY ORDER OF COMPUTER TRACE RECORDS

BACKGROUND

Distributed computer systems include multiple distributed machines, which often generate a substantial number of traces. Moreover, each trace usually includes a substantial number of trace records. Complex correlations often exist among the events that are indicated by the trace records. Due to clock skew between the machines, it is often difficult to determine the order of the events, which makes analysis of the traces a challenging endeavor.

If the various traces were merely merged based on the local timestamps of the respective machines, some of the causalities associated with the events may be lost in the merged trace due to the clock skew between the machines. For example, if machine A sends a message to machine B, the message is likely to be received at machine B after several milliseconds. However, the trace record for the send event that is generated at machine A may have a timestamp that is greater than the timestamp of the trace record for the receive event that is generated at machine B. When this happens, the merged trace likely will not accurately reflect the temporal order of the events. Accordingly, trace analysis performed on the merged trace may be relatively challenging. For example, it may not be possible to generate an accurate snapshot of the states of the distributed computer system (i.e., a distributed snapshot) or to perform an accurate distributed invariance check of the distributed computer system.

One proposed solution for ordering trace records in a distributed computer system is referred to as the "Lamport Clock" algorithm. The algorithm requires that whenever a message is sent, the sender's local timestamp is attached to the message. Accordingly, the sender's local timestamp serves as the timestamp of the send event. The receiver of the message assigns a timestamp to the receive event that is greater than the timestamp of the send event, which often involves making the timestamp of the receive event greater than the receiver's local timestamp. The Lamport Clock algorithm is commonly used to generate a distributed snapshot. Theoretically, the Lamport Clock should enable the traces from the various machines in the distributed computer system to be merged to obtain a consistent order that captures all the causalities associated with the events that are indicated by the trace records. However, in practice, achieving the ordering and capturing the causalities often is not possible for a variety of reasons.

For example, the Lamport Clock algorithm requires each machine that produces a trace to implement the algorithm, which is not trivial. In another example, some low level protocol messages cannot have a Lamport Clock timestamp. For instance, if an attempt is made to connect to a port of a machine and the port is not being monitored, an Internet Control Message Protocol (ICMP) message may be generated to indicate that the connection has been rejected. However, because the ICMP message is part of the TCP/IP stack, it is not possible to add a Lamport Clock timestamp to the ICMP message. In yet another example, correlation between machines sometimes is achieved by using correlated timers, rather than by passing messages. For instance, if machine A is aware that machine B starts a timer earlier than machine A starts its timer with the same duration, machine A may infer that its timer will expire after the timer of machine B. This inference enables partially synchronous systems (e.g., those on timers) to implement certain behaviors that are theoretically impossible in a completely asynchronous system.

SUMMARY

Various approaches are described herein for, among other things, establishing causality order of computer trace records. A computer trace record is information that indicates an event that occurs with regard to execution of a computer program. For instance, machines in a distributed computer system may generate such computer trace records as the machines execute the computer program. The computer trace records that are generated by each machine are referred to as a trace. Accordingly, each machine generates its own trace. The traces generated by the respective machines may be combined to provide an aggregated trace.

The approaches described herein are capable of ordering the computer trace records in the aggregated trace to accurately reflect the causality order of the computer trace records. A causality order of computer trace records is a temporal sequence of the computer trace records in which each cause event is indicated to occur before each effect event that is caused by the cause event. A cause event is an event that causes an effect event. For instance, the cause event may cause a single effect event or multiple effect events. An effect event is an event that is caused by a cause event. For instance, the effect event may be caused by a single cause event or multiple cause events.

In a first example approach, computer trace records include first record(s), second record(s), and third record(s). The first record(s) are identified to be respective cause record(s). Each cause record indicates a cause event that causes an effect event. The second record(s) are identified to be respective effect record(s). Each effect record indicates an effect event that is caused by a cause event. The third record(s) are identified to be respective normal record(s). Each normal record indicates a normal event. A normal event is not a cause event and is not an effect event. In a non-runtime context, each cause record is correlated with each effect record that indicates an effect event that is caused by a cause event that is indicated by the respective cause record based on one or more criteria to establish an accurate causality order of the computer trace records. In the non-runtime context, the aggregated trace is generated to include the computer trace records in accordance with the accurate causality order.

In a second example approach, computer trace records include first record(s), second record(s), and third record(s). The first record(s) are categorized into a cause category based on each first record indicating a cause event that causes an effect event. The second record(s) are categorized into an effect category based on each second record indicating an effect event that is caused by a cause event. The third record(s) are categorized into a normal category based on each third record indicating a normal event. A normal event is not a cause event and is not an effect event. In a non-runtime context, each first record from the cause category is correlated with each second record from the effect category that indicates an effect event that is caused by a cause event that is indicated by the respective first record based on one or more criteria to establish an accurate causality order of the computer trace records. In the non-runtime context, the aggregated trace is generated to include the computer trace records in accordance with the accurate causality order.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
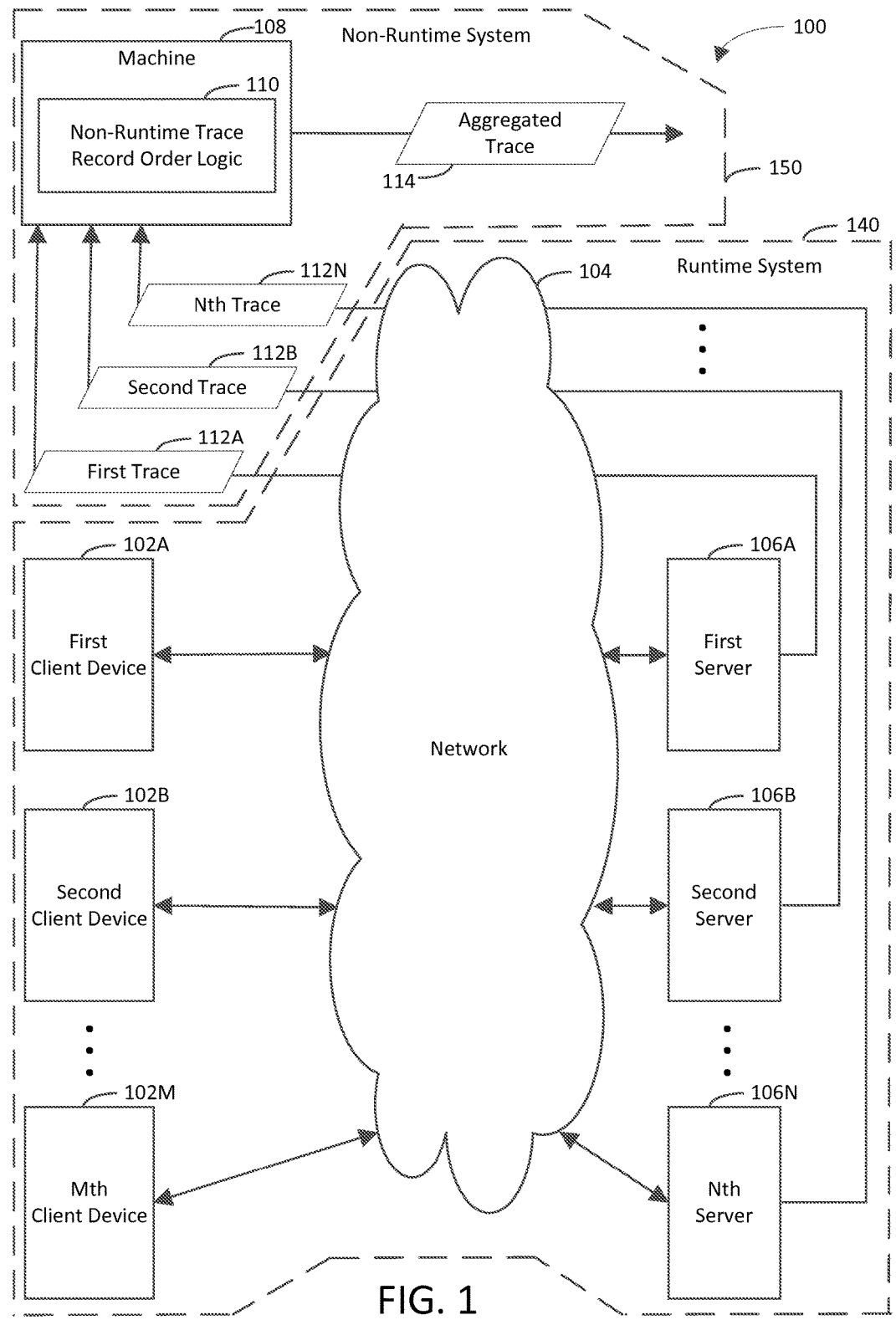
FIG. 1 is a block diagram of an example networked system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

In this document, terms such as "first", "second", and "third" are used merely to facilitate the discussion and are not intended to be limiting. Such terms are not intended to indicate a sequence. For example, first record(s) need not necessarily precede second and/or third record(s) in time. In another example, second record(s) need not necessarily follow first record(s) and need not necessarily precede third record(s).

II. Example Embodiments

Example embodiments described herein are capable of establishing causality order of computer trace records. A computer trace record is information that indicates an event that occurs with regard to execution of a computer program. For instance, machines in a distributed computer system may generate such computer trace records as the machines execute the computer program. The computer trace records that are generated by each machine are referred to as a trace. Accordingly, each machine generates its own trace in accordance with a tracing technique. The traces generated by the respective machines may be combined to provide an aggregated trace.

The approaches described herein are capable of ordering the computer trace records in the aggregated trace to accurately reflect the causality order of the computer trace records. A causality order of computer trace records is a temporal sequence of the computer trace records in which each cause event is indicated to occur before each effect event that is caused by the cause event. A cause event is an event that causes an effect event. For instance, the cause event may cause a single effect event or multiple effect events. An effect event is an event that is caused by a cause event. For instance, the effect event may be caused by a single cause event or multiple cause events.

Example techniques described herein have a variety of benefits as compared to conventional techniques that attempt to order computer trace records. For instance, the example techniques may be capable of establishing an accurate causality order of the computer trace records in a non-runtime context. Accordingly, the example techniques may enable traces from respective machines in a distributed computer system to be merged to obtain a consistent order that captures all the causalities associated with the events that are indicated by the computer trace records in the traces. For instance, the example techniques may enable the traces to be merged to obtain the consistent order that captures all the causalities associated with the events without requiring a change to the runtime system, which may reduce a runtime cost of the distributed computer system. Expressing the causalities in an aggregated trace in the non-runtime context may increase efficiency and/or reduce complexity of the operation of the distributed computer system, as compared to techniques that attempt to order computer trace records in a runtime context. For instance, the distributed computer system may support relatively few relationship types, and expressing such relationship types, such as the aforementioned causalities, may be relatively easy to do.

The example techniques may not be negatively affected by clock skew between the machines that generate the respective traces. The example techniques may enable analysis of the traces that are generated by the respective machines to be performed more accurately and/or more efficiently than the conventional techniques. For instance, the example techniques may be capable of generating an accurate snapshot of the states of the distributed computer system and/or performing an accurate distributed invariance check of the distributed computer system. An invariance is a property of a system that is always true. An invariance check is configured to determine whether an invariance of the system is detected as being true. The example techniques may be capable of accurately ordering events associated with low level protocol messages. The example techniques may be capable of accurately ordering events associated with machines that have correlated timers. The example techniques may substantially reduce an amount of time and/or resources (e.g., processor cycles) that are consumed to perform trace analysis with regard to a computer program in a distributed computer system.

FIG. 1 is a block diagram of an example networked system 100 in accordance with an embodiment. Generally speaking, networked system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, networked system 100 establishes causality order of computer trace records. Detail regarding techniques for establishing causality order of computer trace records is provided in the following discussion.

As shown in FIG. 1, networked system 100 includes a runtime system 140 and a non-runtime (e.g., offline) system 150. Runtime system 140 operates at runtime to generate traces 112A-112N. Non-runtime system 150 operates offline (i.e., not at runtime) to process the traces 112A-112N. Runtime system 140 and non-runtime system 150 are discussed in further detail below.

Runtime system 140 includes a plurality of client devices 102A-102M, a network 104, and a plurality of servers 106A-106N. Communication among client devices 102A-102M and servers 106A-106N is carried out over network 104 using well-known network communication protocols. Network 104 may be a wide-area network (e.g., the Internet), a local area network (LAN), another type of network, or a combination thereof.

Client devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. Client devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, client devices 102A-102M are capable of accessing domains (e.g., Web sites) hosted by servers 104A-104N, so that client devices 102A-102M may access information that is available via the domains. Such domain may include Web pages, which may be provided as hypertext markup language (HTML) documents and objects (e.g., files) that are linked therein, for example.

Client devices 102A-102M may include any client-enabled system or device, including but not limited to a desktop computer, a laptop computer, a tablet computer, a personal digital assistant, a cellular telephone, a wearable device, or the like. It will be recognized that any one or more client devices 102A-102M may communicate with any one or more servers 106A-106N.

Servers 106A-106N are processing systems that are capable of communicating with client devices 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of networked system 100.

Servers 106A-106N are further configured to generate respective traces 112A-112N in response to execution of a computer program. For instance, servers 106A-106N may generate the respective traces 112A-112N in response to execution of respective portions of the computer program. Each of the traces 112A-112N includes a respective subset of a plurality of computer trace records for which a causality order is to be established in accordance with one or more techniques described herein. For purposes of illustration, it may be presumed that the computer trace record(s) in each subset are accurately temporally ordered. For instance, if a computer trace includes a first computer trace record, which indicates event A, that precedes a second computer trace record, which indicates event B, it may be presumed that event A occurred before event B.

Non-runtime system 150 includes machine 108. Machine 108 is a processing system that is capable of processing computer trace records. Machine 108 includes non-runtime trace record order logic 110 configured to establish the causality order of the computer trace records that are included in the traces 112A-112N. Non-runtime trace record order logic 110 is further configured to generate an aggregated trace 114 that includes the computer trace records in accordance with the established causality order. The traces 112A-112N may be modeled as respective input streams, and the aggregated trace 114 may be modeled as an output stream, though the scope of the example embodiments is not limited in this respect.

Example techniques for establish a causality order of computer trace records are discussed in greater detail below with reference to FIGS. 2-6.

Non-runtime trace record order logic 110 is shown to be incorporated in machine 108 for illustrative purposes and is not intended to be limiting. It will be recognized that at least a portion (e.g., all) of non-runtime trace record order logic 110 may be external to machine 108. For example, at least a portion of non-runtime trace record order logic 110 may be incorporated in any one or more of the client devices 102A-102M and/or any one or more of the servers 106A-106N. In accordance with this example, client-side aspects of non-runtime trace record order logic 110 may be incorporated in one or more of the client devices 102A-102M, and server-side aspects of non-runtime trace record order logic 110 may be incorporated in one or more of the servers 106A-106N and/or machine 108.

Non-runtime trace record order logic 110 may be implemented in various ways to establish causality order of computer trace records, including being implemented in hardware, software, firmware, or any combination thereof. For example, non-runtime trace record order logic 110 may be implemented as computer program code configured to be executed in one or more processors. In another example, non-runtime trace record order logic 110 may be implemented as hardware logic/electrical circuitry. For instance, non-runtime trace record order logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

It will be recognized that any one or more of client devices 102A-102M, any one or more of servers 106A-106N, and/or machine 108 may be implemented as a virtual machine, though the scope of the example embodiments is not limited in this respect.

FIGS. 2-5 depict flowcharts 200, 300, 400, and 500 of example methods for establishing an accurate causality order of computer trace records in accordance with embodiments. Flowcharts 200, 300, 400, and 500 may be performed by machine 108 shown in FIG. 1, for example. For illustrative purposes, flowcharts 200, 300, 400, and 500 are described with respect to a machine 600 shown in FIG. 6. As shown in FIG. 6, machine 600 includes non-runtime trace record order logic 610 and store 612. Non-runtime trace record order logic 610 includes identification logic 602, assignment logic 604, correlation logic 606, generation logic 608, and determination logic 614. Further structural and operational embodiments will be apparent to persons skilled in the relevant art(s) based on the discussion regarding flowcharts 200, 300, 400, and 500.

Figure 2:
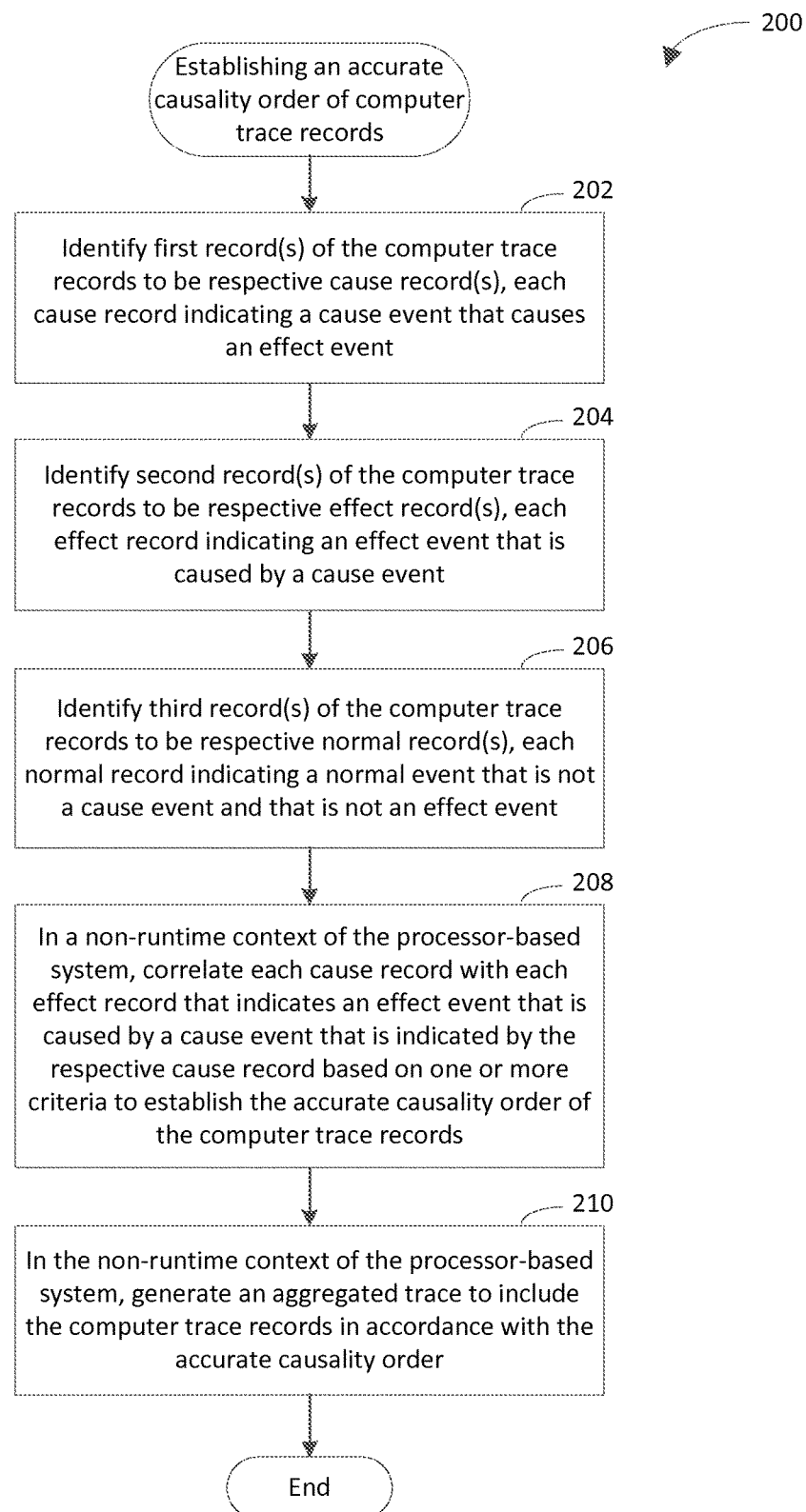
FIGS. 2-5 depict flowcharts of example methods for establishing an accurate causality order of computer trace records in accordance with embodiments.

As shown in FIG. 2, the method of flowchart 200 begins at step 202. In step 202, first record(s) of the computer trace records are identified to be respective cause record(s). Each cause record indicates a cause event that causes an effect event. Each of the cause record(s) may be generated before occurrence of the cause event that is indicated by the respective cause record, though the example embodiments are not limited in this respect. For instance, if a cause record indicates that a message is to be sent, the cause record may be produced before the message is sent. In an example implementation, identification logic 602 identifies first record(s) of computer trace records 616 to be respective cause record(s) 618.

At step 204, second record(s) of the computer trace records are identified to be respective effect record(s). Each effect record indicates an effect event that is caused by a cause event. In an example implementation, identification logic 602 identifies second record(s) of computer trace records 616 to be respective effect record(s) 620.

At step 206, third record(s) of the computer trace records are identified to be respective normal record(s). Each normal record indicates a normal event. A normal event is an event that is not a cause event and that is not an effect event. For instance, each normal event may not be involved in a cause-effect relationship with regard to execution of the computer program. In an example implementation, identification logic 602 identifies third record(s) of computer trace records 616 to be respective normal record(s) 622.

At step 208, in a non-runtime context of the processor-based system, each cause record is correlated with each effect record that indicates an effect event that is caused by a cause event that is indicated by the respective cause record based on one or more criteria to establish the accurate causality order of the computer trace records. For instance, a determination whether the one or more criteria are satisfied may be made based on semantic information associated with the cause record(s) and the effect record(s). In an example implementation, in a non-runtime context of the machine 600, correlation logic 606 correlates each of the cause record(s) 618 with each of the effect record(s) 620 that indicates an effect event that is caused by a cause event that is indicated by the respective cause record based on one or more criteria to establish the accurate causality order of the computer trace records 616. For example, correlation logic 606 may provide an order instruction 626 in response to establishing the accurate causality order. In accordance with this example, the order instruction 626 may specify that the computer trace records 616 are to be ordered in accordance with the accurate causality order.

At step 210, in the non-runtime context of the processor-based system, the aggregated trace is generated to include the computer trace records in accordance with the accurate causality order. For instance, the aggregated trace may be generated such that the computer trace records are arranged to be in the accurate causality order. In an example implementation, in the non-runtime context of the machine 600, generation logic 608 generates an aggregated trace 630 to include the computer trace records 616 in accordance with the accurate causality order. For instance, generation logic 608 may generate the aggregated trace 630 to include the computer trace records 616 in accordance with the accurate causality order in response to (e.g., based on) receipt of the order instruction 626.

In an example embodiment, a designated cause record of the cause record(s) indicates that a first timer is expired. In accordance with this embodiment, a designated effect record of the effect record(s) indicates that a second timer is started. The second timer is related to the first timer. In further accordance with this embodiment, step 208 includes, in the non-runtime context of the processor-based system, correlating the designated cause record with the designated effect record based on the first timer being related to the second timer.

In another example embodiment, a designated cause record of the cause record(s) indicates that specified data is written to a store that is external to the processing system that generated the designated cause record. In accordance with this embodiment, a designated effect record of the effect record(s) indicates that the specified data is read from the store. In further accordance with this embodiment, step 208 includes, in the non-runtime context of the processor-based system, correlating the designated cause record with the designated effect record based on the one or more criteria.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 includes assigning identifier(s) to the respective cause record(s). Each identifier uniquely identifies the cause record to which the identifier is assigned. In an aspect, the identifier(s) are globally unique identifier(s) (GUID(s)). For example, assignment logic 604 may assign identifier(s) 624 to the respective cause record(s) 618. In accordance with this embodiment, step 208 includes, in the non-runtime context of the processor-based system, correlating each of the cause record(s) with each of the effect record(s) that indicates an effect event that is caused by a cause event that is indicated by the respective cause record based on each of the effect record(s) that indicates an effect event that is caused by a cause event that is indicated by the respective cause record being associated with the respective identifier. For example, correlation logic 606 may correlate each of the cause record record(s) 618 with each of the effect record(s) 620 that indicates an effect event that is caused by a cause event that is indicated by the respective cause record in response to (e.g., based on) receipt of the identifier(s) 624.

In another example embodiment, a first cause record of the cause record(s) indicates that a specified message is sent. In accordance with this embodiment, a first effect record of the effect record(s) indicates that the specified message is received. In further accordance with this embodiment, the method of flowchart 200 includes assigning a message identifier to the specified message. In an aspect, assignment logic 604 may assign the message identifier to the specified message. In accordance with this aspect, the message identifier may be included in identifier(s) 624. In further accordance with this embodiment, step 208 includes, in the non-runtime context of the processor-based system, correlating the first cause record with the first effect record based on the message identifier being assigned to the specified message. For instance, correlation logic 606 may correlate the first cause record with the first effect record in response to (e.g., based on) receipt of the message identifier.

Figure 3:
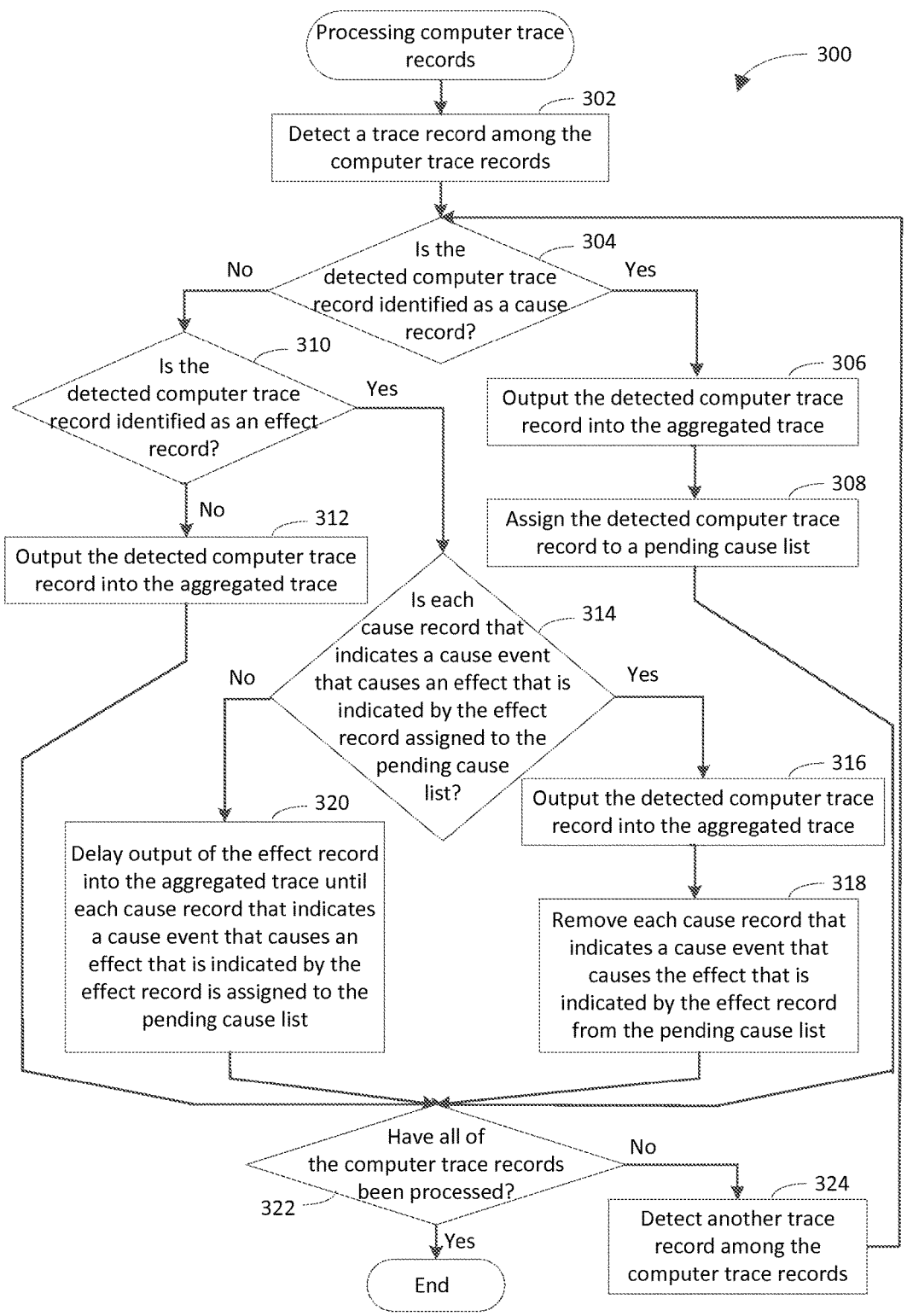

In yet another example embodiment, the method of flowchart 200 includes the steps shown in flowchart 300 of FIG. 3. As shown in FIG. 3, the method of flowchart 300 begins at step 302. In step 302, a trace record is detected among the computer trace records. For instance, determination logic 614 may detect the computer trace record among the computer trace records 616.

At step 304, a determination is made whether the detected computer trace record is identified as a cause record. If the detected computer trace record is identified as a cause record (e.g., at step 202), flow continues to step 306. Otherwise, flow continues to step 310. In an example implementation, determination logic 614 determines whether the detected computer trace record is identified as a cause record.

At step 306, the detected computer trace record is output (e.g., incorporated) into the aggregated trace. For instance, generation logic 608 may output the detected computer trace record into the aggregated trace 630.

At step 308, the detected computer trace record is assigned to a pending cause list. The pending cause list may be a hash table, though the scope of the example embodiments is not limited in this respect. In an example implementation, store 612 stores a pending cause list 628. In accordance with this example, assignment logic 604 may assign the detected computer trace record to the pending cause list 628. It will be recognized that store 612 may be any suitable type of store. One type of store is a database. For instance, store 612 may be a relational database, an entity-relationship database, an object database, an object relational database, an extensible markup language (XML) database, etc. Store 612 is shown in FIG. 6 to be internal to machine 600 for illustrative purposes and is not intended to be limiting. It will be recognized that store 612 or a portion thereof may be external to machine 600. It will also be recognized that store 612 or a portion thereof may be distributed across two or more of servers 106A-106N or across machine 600 and one or more of servers 106A-106N. It will be further recognized that store 612 or a portion thereof may be included in non-runtime trace record order logic 610. Upon completion of step 308, flow continues to step 322.

At step 310, a determination is made whether the detected computer trace record is identified as an effect record. If the detected computer trace record is identified as an effect record (e.g., at step 204), flow continues to step 314. Otherwise, flow continues to step 312. For instance, if the detected computer trace record is not identified as an effect record, the detected computer trace record may be identified as a normal record (e.g., at step 206). In an example implementation, determination logic 614 determines whether the detected computer trace record is identified as an effect record.

At step 312, the detected computer trace record is output into the aggregated trace. For instance, generation logic 608 may output the detected computer trace record into the aggregated trace 630. Upon completion of step 312, flow continues to step 322.

At step 314, a determination is made whether each cause record that indicates a cause event that causes an effect that is indicated by the effect record is assigned to the pending cause list. If each cause record that indicates a cause event that causes an effect that is indicated by the effect record is assigned to the pending cause list, flow continues to step 316. Otherwise, flow continues to step 320. In an example implementation, determination logic 614 determines whether each of the cause record(s) 618 that indicates a cause event that causes an effect that is indicated by the effect record is assigned to the pending cause list 628.

At step 316, the detected computer trace record is output into the aggregated trace. For instance, generation logic 608 may output the detected computer trace record into the aggregated trace 630.

At step 318, each cause record that indicates a cause event that causes the effect that is indicated by the effect record is removed from the pending cause list. For instance, generation logic 608 may remove each cause record that indicates a cause event that causes the effect that is indicated by the effect record from the pending cause list 628. Upon completion of step 318, flow continues to step 322.

In an example embodiment, the effect record mentioned in step 318 may be one of multiple effect records indicating respective effects that are caused by one or more causes that are indicated by one or more respective cause records. In accordance with this embodiment, removing each cause record that indicates a cause event that causes the effect that is indicated by the effect record from the pending cause list may be delayed until all of the multiple effect records indicating respective effects that are caused by the respective cause are output into the aggregated trace.

At step 320, output of the effect record into the aggregated trace is delayed until each cause record that indicates a cause event that causes an effect that is indicated by the effect record is assigned to the pending cause list. For instance, generation logic 608 may delay output of the effect record into the aggregated trace 630 until each of the cause record(s) 618 that indicates a cause event that causes an effect that is indicated by the effect record is assigned to the pending cause list 628. Upon completion of step 320, flow continues to step 322.

In an example embodiment, the computer trace records (e.g., computer trace records 616) are included among traces (e.g., traces 112A-112N) that are generated by respective processing systems (e.g., servers 106A-106N). In accordance with this embodiment, each trace includes a respective subset of the computer trace records. Each subset includes one or more of the computer trace records. In further accordance with this embodiment, step 320 includes delaying output of other computer trace records in the subset that includes the effect record into the aggregated trace until each cause record that indicates a cause event that causes an effect that is indicated by the effect record is assigned to the pending cause list. For instance, generation logic 608 may delay output of others of the computer trace records 616 in the subset that includes the effect record into the aggregated trace 630 until each cause record that indicates a cause event that causes an effect that is indicated by the effect record is assigned to the pending cause list 628. In an aspect, step 320 may include not delaying output of other computer trace records in subsets other than the subset that includes the effect record into the aggregated trace until each cause record that indicates a cause event that causes an effect that is indicated by the effect record is assigned to the pending cause list.

At step 322, a determination is made whether all of the computer trace records have been processed. If all of the computer trace records have been processed, flowchart 300 ends. Otherwise, flow continues to step 324. For instance, determination logic 614 may determine whether all of the computer trace records 616 have been processed.

At step 324, another trace record is detected among the computer trace records. For instance, determination logic 614 may detect another trace record among the computer trace records 616. Upon completion of step 324, flow returns to step 304.

In some example embodiments, one or more steps 302, 304, 306, 308, 310, 312, 314, 316, 318, 320, 322, and/or 324 of flowchart 300 may not be performed. Moreover, steps in addition to or in lieu of steps 302, 304, 306, 308, 310, 312, 314, 316, 318, 320, 322, and/or 324 may be performed.

Figure 4:
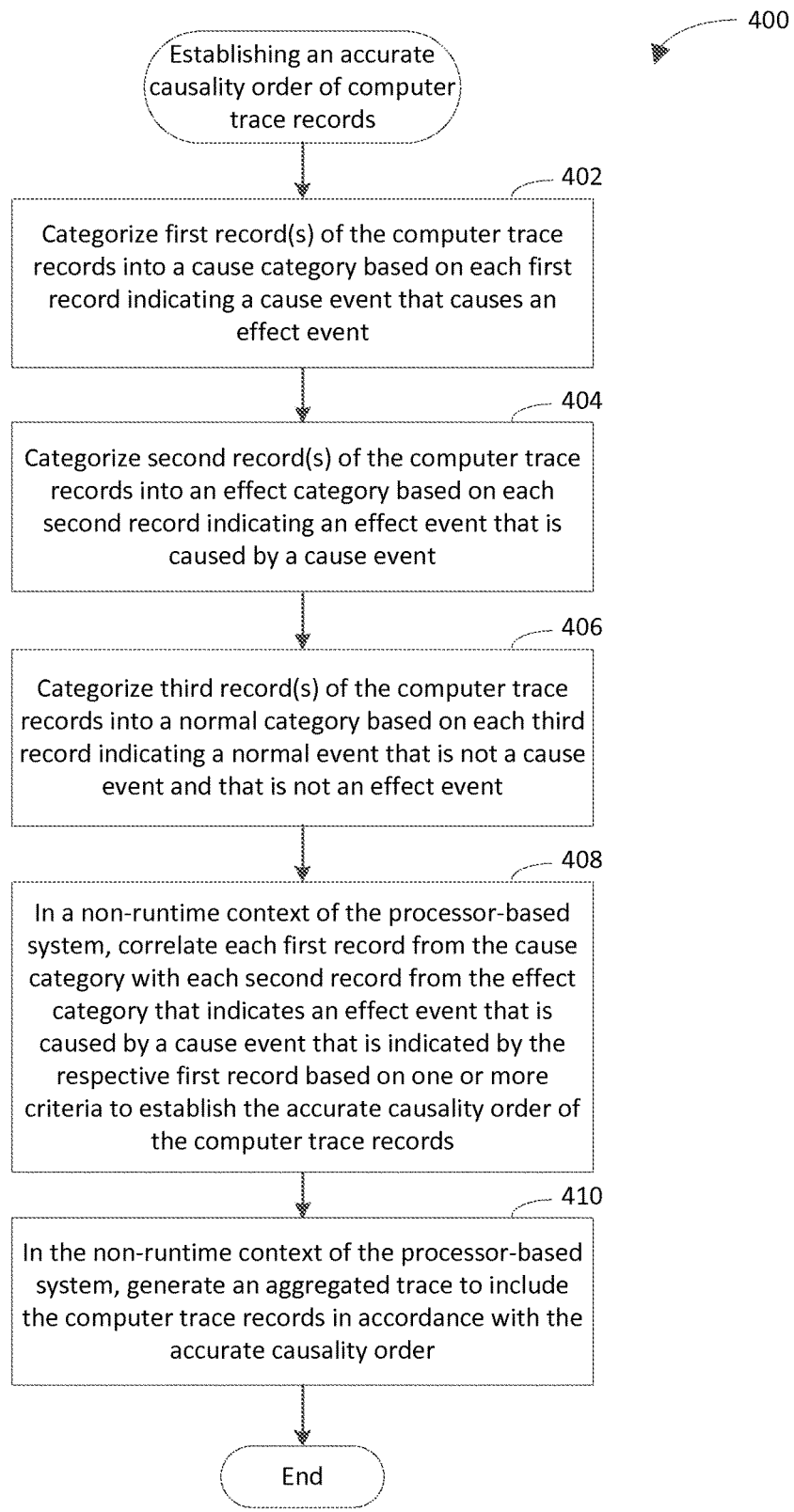

As shown in FIG. 4, the method of flowchart 400 begins at step 402. In step 202, first record(s) of the computer trace records are categorized into a cause category based on each first record indicating a cause event that causes an effect event. Each first record may be generated before occurrence of the cause event that is indicated by the respective first record, though the example embodiments are not limited in this respect. In an example implementation, identification logic 602 categorizes first record(s) of computer trace records 616 into the cause category.

At step 404, second record(s) of the computer trace records are categorized into an effect category based on each second record indicating an effect event that is caused by a cause event. In an example implementation, identification logic 602 categorizes second record(s) of computer trace records 616 into the effect category.

At step 406, third record(s) of the computer trace records are categorized into a normal category based on each third record indicating a normal event that is not a cause event and that is not an effect event. In an example implementation, identification logic 602 categorizes third record(s) of computer trace records 616 into the normal category.

At step 408, in a non-runtime context of the processor-based system, each first record from the cause category is correlated with each second record from the effect category that indicates an effect event that is caused by a cause event that is indicated by the respective first record based on one or more criteria to establish the accurate causality order of the computer trace records. In an example implementation, in a non-runtime context of the machine 600, correlation logic 606 correlates each first record from the cause category (e.g., each of the cause record(s) 618) with each second record from the effect category (e.g., each of the effect record(s) 620) that indicates an effect event that is caused by a cause event that is indicated by the respective first record based on one or more criteria to establish the accurate causality order of the computer trace records 616. For example, correlation logic 606 may provide an order instruction 626 in response to establishing the accurate causality order. In accordance with this example, the order instruction 626 may specify that the computer trace records 616 are to be ordered in accordance with the accurate causality order.

At step 410, in the non-runtime context of the processor-based system, the aggregated trace is generated to include the computer trace records in accordance with the accurate causality order. For instance, the aggregated trace may be generated such that the computer trace records are arranged to be in the accurate causality order. In an example implementation, in the non-runtime context of the machine 600, generation logic 608 generates an aggregated trace 630 to include the computer trace records 616 in accordance with the accurate causality order. For instance, generation logic 608 may generate the aggregated trace 630 to include the computer trace records 616 in accordance with the accurate causality order in response to (e.g., based on) receipt of the order instruction 626.

In an example embodiment, a designated first record of the first record(s) indicates that a first timer is expired. In accordance with this embodiment, a designated second record of the second record(s) indicates that a second timer is started. The second timer is related to the first timer. In further accordance with this embodiment, step 408 includes, in the non-runtime context of the processor-based system, correlating the designated first record with the designated second record based on the first timer being related to the second timer.

In another example embodiment, a designated first record of the first record(s) indicates that specified data is written to a store that is external to the processing system that generated the designated first record. In accordance with this embodiment, a designated second record of the second record(s) indicates that the specified data is read from the store. In further accordance with this embodiment, step 208 includes, in the non-runtime context of the processor-based system, correlating the designated first record with the designated second record based on the one or more criteria.

In some example embodiments, one or more steps 402, 404, 406, 408, and/or 410 of flowchart 400 may not be performed. Moreover, steps in addition to or in lieu of steps 402, 404, 406, 408, and/or 410 may be performed. For instance, in an example embodiment, the method of flowchart 400 includes assigning identifier(s) to the respective first record(s). Each identifier uniquely identifies the first record to which the identifier is assigned. For example, assignment logic 604 may assign identifier(s) 624 to the respective first record(s) 618. In accordance with this embodiment, step 208 includes, in the non-runtime context of the processor-based system, correlating each first record with each second record that indicates an effect event that is caused by a cause event that is indicated by the respective first record based on each second record that indicates an effect event that is caused by a cause event that is indicated by the respective first record being associated with the respective identifier. For example, correlation logic 606 may correlate each first record with each second record that indicates an effect event that is caused by a cause event that is indicated by the respective first record in response to (e.g., based on) receipt of the identifier(s) 624.

In another example embodiment, a designated first record of the first record(s) indicates that a specified message is sent. In accordance with this embodiment, a designated second record of the second record(s) indicates that the specified message is received. In further accordance with this embodiment, the method of flowchart 400 includes assigning a message identifier to the specified message. In an aspect, assignment logic 604 may assign the message identifier to the specified message. In accordance with this aspect, the message identifier may be included in identifier(s) 624. In further accordance with this embodiment, step 408 includes, in the non-runtime context of the processor-based system, correlating the designated first record with the designated second record based on the message identifier being assigned to the specified message. For instance, correlation logic 606 may correlate the designated first record with the designated second record in response to (e.g., based on) receipt of the message identifier.

Figure 5:
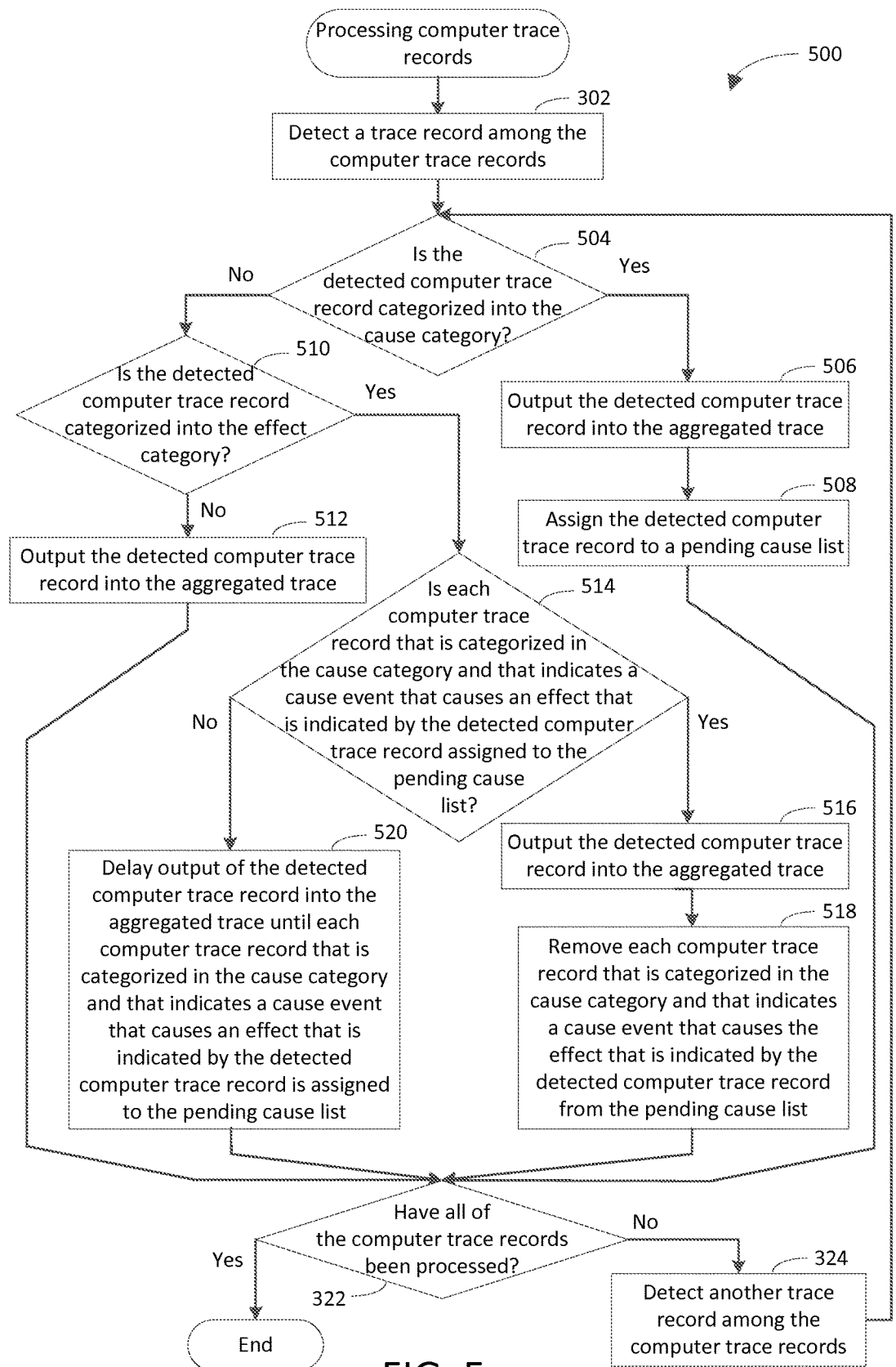
Figure 6:
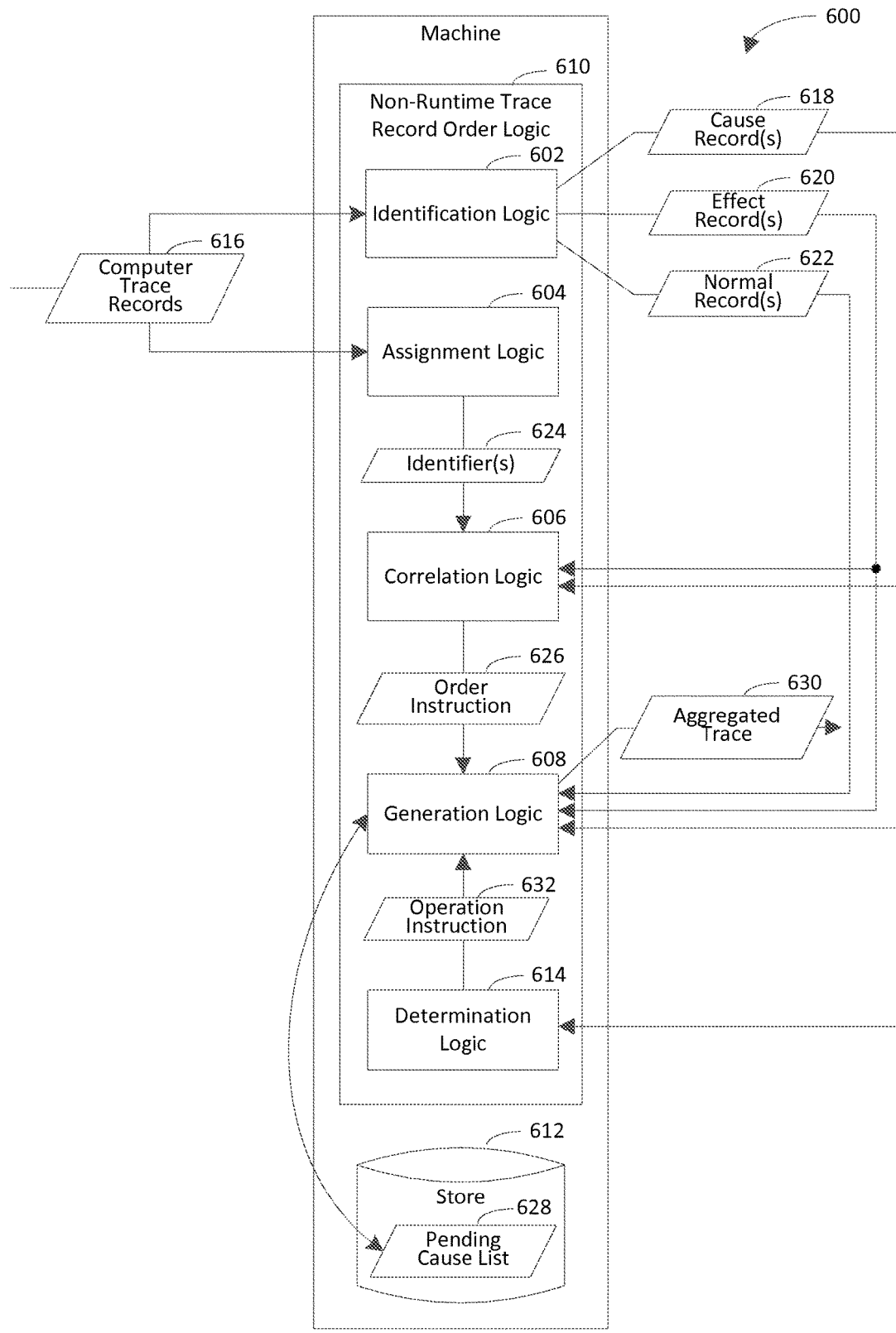
FIG. 6 is a block diagram of an example machine shown in FIG. 1 in accordance with an embodiment.

In yet another example embodiment, the method of flowchart 400 includes the steps shown in flowchart 500 of FIG. 5. As shown in FIG. 5, the method of flowchart 500 begins at step 502. In step 502, a trace record is detected among the computer trace records. For instance, determination logic 614 may detect a trace record among the computer trace records 616.

At step 504, a determination is made whether the detected computer trace record is categorized into the cause category. If the detected computer trace record is categorized into the cause category (e.g., at step 402), flow continues to step 506. Otherwise, flow continues to step 510. In an example implementation, determination logic 614 determines whether the detected computer trace record is categorized into the cause category.

At step 506, the detected computer trace record is output (e.g., incorporated) into the aggregated trace. For instance, generation logic 608 may output the detected computer trace record into the aggregated trace 630.

At step 508, the detected computer trace record is assigned to a pending cause list. The pending cause list may be a hash table, though the scope of the example embodiments is not limited in this respect. In an example implementation, store 612 stores a pending cause list 628. In accordance with this example, assignment logic 604 may assign the detected computer trace record to the pending cause list 628. Upon completion of step 508, flow continues to step 522.

At step 510, a determination is made whether the detected computer trace record is categorized into the effect category. If the detected computer trace record is categorized into the effect category (e.g., at step 404), flow continues to step 514. Otherwise, flow continues to step 512. For instance, if the detected computer trace record is not categorized into the effect category, the detected computer trace record may be categorized into the normal category (e.g., at step 406). In an example implementation, determination logic 614 determines whether the detected computer trace record is categorized into the effect category.

At step 512, the detected computer trace record is output into the aggregated trace. For instance, generation logic 608 may output the detected computer trace record into the aggregated trace 630. Upon completion of step 512, flow continues to step 522.

At step 514, a determination is made whether each computer trace record that is categorized in the cause category and that indicates a cause event that causes an effect that is indicated by the detected computer trace record is assigned to the pending cause list. If each computer trace record that is categorized in the cause category and that indicates a cause event that causes an effect that is indicated by the detected computer trace record is assigned to the pending cause list, flow continues to step 516. Otherwise, flow continues to step 520. In an example implementation, determination logic 614 determines whether each of the computer trace records 616 that is categorized in the cause category and that indicates a cause event that causes an effect that is indicated by the detected computer trace record is assigned to the pending cause list 628.

At step 516, the detected computer trace record is output into the aggregated trace. For instance, generation logic 608 may output the detected computer trace record into the aggregated trace 630.

At step 518, each computer trace record that is categorized in the cause category and that indicates a cause event that causes the effect that is indicated by the detected computer trace record is removed from the pending cause list. For instance, generation logic 608 may remove each computer trace record that is categorized in the cause category and that indicates a cause event that causes the effect that is indicated by the detected computer trace record from the pending cause list 628. Upon completion of step 518, flow continues to step 522.

In an example embodiment, the detected computer trace record may be one of multiple computer trace records categorized in the effect category that indicate respective effects that are caused by one or more causes that are indicated by one or more respective computer trace records categorized in the cause category. In accordance with this embodiment, removing each computer trace record that is categorized in the cause category and that indicates a cause event that causes the effect that is indicated by the detected computer trace record from the pending cause list may be delayed until all of the multiple computer trace records categorized in the effect category that indicate respective effects that are caused by the respective cause are output into the aggregated trace.

At step 520, output of the detected computer trace record into the aggregated trace is delayed until each computer trace record that is categorized in the cause category and that indicates a cause event that causes an effect that is indicated by the detected computer trace record is assigned to the pending cause list. For instance, generation logic 608 may delay output of the detected computer trace record into the aggregated trace 630 until each computer trace record that is categorized in the cause category and that indicates a cause event that causes an effect that is indicated by the detected computer trace record is assigned to the pending cause list 628. Upon completion of step 520, flow continues to step 522.

In an example embodiment, the computer trace records (e.g., computer trace records 616) are included among traces (e.g., traces 112A-112N) that are generated by respective processing systems (e.g., servers 106A-106N). In accordance with this embodiment, each trace includes a respective subset of the computer trace records. Each subset includes one or more of the computer trace records. In further accordance with this embodiment, step 520 includes delaying output of other computer trace records in the subset that includes the detected computer trace record into the aggregated trace until each computer trace record that is categorized in the cause category and that indicates a cause event that causes an effect that is indicated by the detected computer trace record is assigned to the pending cause list. For instance, generation logic 608 may delay output of others of the computer trace records 616 in the subset that includes the detected computer trace record into the aggregated trace 630 until each computer trace record that indicates a cause event that is categorized in the cause category and that causes an effect that is indicated by the detected computer trace record is assigned to the pending cause list 628. In an aspect, step 320 may include not delaying output of other computer trace records in subsets other than the subset that includes the detected computer trace record into the aggregated trace until each computer trace record that is categorized in the cause category and that indicates a cause event that causes an effect that is indicated by the detected computer trace record is assigned to the pending cause list.

At step 522, a determination is made whether all of the computer trace records have been processed. If all of the computer trace records have been processed, flowchart 500 ends. Otherwise, flow continues to step 524. For instance, determination logic 614 may determine whether all of the computer trace records have been processed.

At step 524, another trace record is detected among the computer trace records. For instance, determination logic 614 may detect another trace record among the computer trace records 616. Upon completion of step 524, flow returns to step 504.

In some example embodiments, one or more steps 502, 504, 506, 508, 510, 512, 514, 516, 518, 520, 522, and/or 524 of flowchart 500 may not be performed. Moreover, steps in addition to or in lieu of steps 502, 504, 506, 508, 510, 512, 514, 516, 518, 520, 522, and/or 524 may be performed.

It will be recognized that machine 600 may not include one or more of non-runtime trace record order logic 610, store 612, identification logic 602, assignment logic 604, correlation logic 606, generation logic 608, and/or determination logic 614. Furthermore, machine 600 may include components in addition to or in lieu of non-runtime trace record order logic 610, store 612, identification logic 602, assignment logic 604, correlation logic 606, generation logic 608, and/or determination logic 614.

Any one or more of client devices 102A-102M, any one or more of servers 106A-106N, machine 108, identification logic 602, assignment logic 604, correlation logic 606, generation logic 608, non-runtime trace record order logic 610, determination logic 614, flowchart 200, flowchart 300, flowchart 400, and/or flowchart 500 may be implemented in hardware, software, firmware, or any combination thereof.

For example, any one or more of client devices 102A-102M, any one or more of servers 106A-106N, machine 108, identification logic 602, assignment logic 604, correlation logic 606, generation logic 608, non-runtime trace record order logic 610, determination logic 614, flowchart 200, flowchart 300, flowchart 400, and/or flowchart 500 may be implemented, at least in part, as computer program code configured to be executed in one or more processors.

In another example, any one or more of client devices 102A-102M, any one or more of servers 106A-106N, machine 108, identification logic 602, assignment logic 604, correlation logic 606, generation logic 608, non-runtime trace record order logic 610, determination logic 614, flowchart 200, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of establishing an accurate causality order of a plurality of computer trace records, which correspond to a plurality of respective events that occur with regard to execution of a computer program, in an aggregated trace using one or more processors of a processor-based system that is coupled to a plurality of distributed processing systems via a network, one or more first records of the plurality of computer trace records are identified, using at least one of the one or more processors, to be one or more respective cause records. Each cause record indicates a cause event that causes an effect event. The plurality of computer trace records includes a plurality of subsets. Each subset of the plurality of subsets includes one or more computer trace records of the plurality of computer trace records that are included in a respective trace that is generated by a respective processing system of the plurality of processing systems. One or more second records of the plurality of computer trace records are identified, using at least one of the one or more processors, to be one or more respective effect records. Each effect record indicates an effect event that is caused by a cause event. One or more third records of the plurality of computer trace records are identified, using at least one of the one or more processors, to be one or more respective normal records. Each normal record indicates a normal event that is not a cause event and that is not an effect event. In a non-runtime context of the processor-based system, each cause record of the one or more cause records is correlated, using at least one of the one or more processors, with each effect record of the one or more effect records that indicates an effect event that is caused by a cause event that is indicated by the respective cause record based on one or more criteria to establish the accurate causality order of the plurality of computer trace records. In the non-runtime context of the processor-based system, the aggregated trace is generated, using at least one of the one or more processors, to include the plurality of computer trace records in accordance with the accurate causality order.

In a first aspect of the first example method, each cause record of the one or more cause records is generated before occurrence of the cause event that is indicated by the respective cause record.

In a second aspect of the first example method, the first example method further comprises assigning one or more identifiers to the one or more respective cause records. In accordance with the second aspect, each identifier uniquely identifies the cause record to which the identifier is assigned. In further accordance with the second aspect, in the non-runtime context of the processor-based system, each cause record of the one or more cause records is correlated with each effect record of the one or more effect records that is caused by the respective cause record comprises, in the non-runtime context of the processor-based system, correlating each cause record of the one or more cause records with each effect record of the one or more effect records that indicates an effect event that is caused by a cause event that is indicated by the respective cause record based on each effect record of the one or more effect records that indicates an effect event that is caused by a cause event that is indicated by the respective cause record being associated with the respective identifier of the one or more identifiers. The second aspect of the first example method may be implemented in combination with the first aspect of the first example method, though the example embodiments are not limited in this respect.

In a third aspect of the first example method, a first cause record of the one or more cause records indicates that a specified message is sent. In accordance with the third aspect, a first effect record of the one or more effect records indicates that the specified message is received. In further accordance with the third aspect, the first example method further comprises assigning a message identifier to the specified message. In further accordance with the third aspect, in the non-runtime context of the processor-based system, correlating each cause record of the one or more cause records with each effect record of the one or more effect records that indicates an effect event that is caused by a cause event that is indicated by the respective cause record comprises, in the non-runtime context of the processor-based system, correlating the first cause record with the first effect record based on the message identifier being assigned to the specified message. The third aspect of the first example method may be implemented in combination with the first and/or second aspect of the first example method, though the example embodiments are not limited in this respect.

In a fourth aspect of the first example method, a designated cause record of the one or more cause records indicates that a first timer is expired. In accordance with the fourth aspect, a designated effect record of the one or more effect records indicates that a second timer, which is related to the first timer, is started. In further accordance with the fourth aspect, in the non-runtime context of the processor-based system, correlating each cause record of the one or more cause records with each effect record of the one or more effect records that indicates an effect event that is caused by a cause event that is indicated by the respective cause record comprises, in the non-runtime context of the processor-based system, correlating the designated cause record with the designated effect record based on the first timer being related to the second timer. The fourth aspect of the first example method may be implemented in combination with the first, second, and/or third aspect of the first example method, though the example embodiments are not limited in this respect.

In a fifth aspect of the first example method, a designated cause record of the one or more cause records indicates that specified data is written to a store that is external to the processing system that generated the designated cause record. In accordance with the fifth aspect, a designated effect record of the one or more effect records indicates that the specified data is read from the store. In further accordance with the fifth aspect, in the non-runtime context of the processor-based system, correlating each cause record of the one or more cause records with each effect record of the one or more effect records that indicates an effect event that is caused by a cause event that is indicated by the respective cause record comprises, in the non-runtime context of the processor-based system, correlating the designated cause record with the designated effect record based on the one or more criteria. The fifth aspect of the first example method may be implemented in combination with the first, second, third, and/or fourth aspect of the first example method, though the example embodiments are not limited in this respect.

In a sixth aspect of the first example method, generating the aggregated trace comprises outputting each computer trace record of the plurality of computer trace records that is identified as a normal record into the aggregated trace. In accordance with the sixth aspect, generating the aggregated trace further comprises outputting each computer trace record of the plurality of computer trace records that is identified as a cause record into the aggregated trace. In further accordance with the sixth aspect, the first example method further comprises assigning each computer trace record of the plurality of computer trace records that is identified as a cause record to a pending cause list. In further accordance with the sixth aspect, the first example method further comprises, for each computer trace record of the plurality of computer trace records that is identified as an effect record, determining whether a designated condition is satisfied. In further accordance with the sixth aspect, the designated condition is that each cause record that indicates a cause event that causes an effect that is indicated by the effect record is assigned to the pending cause list. In further accordance with the sixth aspect, generating the aggregated trace comprises, for each computer trace record of the plurality of computer trace records that is identified as an effect record, performing a first operation or a second operation depending on whether the designated condition is satisfied. In further accordance with the sixth aspect, the first operation comprises, in response to the designated condition being satisfied, outputting the effect record into the aggregated trace and removing each cause record that indicates a cause event that causes the effect that is indicated by the effect record from the pending cause list. In further accordance with the sixth aspect, the second operation comprises, in response to the designated condition not being satisfied, delaying output of the effect record into the aggregated trace until the designated condition is satisfied.

In an example of the sixth aspect of the first example method, the second operation further comprises, in response to the designated condition not being satisfied, delaying output of other computer trace records in the subset that includes the effect record into the aggregated trace until the designated condition is satisfied.

The sixth aspect of the first example method may be implemented in combination with the first, second, third, fourth, and/or fifth aspect of the first example method, though the example embodiments are not limited in this respect.

In a second example method of establishing an accurate causality order of a plurality of computer trace records, which are associated with a computer program, in an aggregated trace using one or more processors of a processor-based system that is coupled to a plurality of distributed processing systems via a network, one or more first records of the plurality of computer trace records are categorized, using at least one of the one or more processors, into a cause category based on each first record indicating a cause event that causes an effect event. The plurality of computer trace records includes a plurality of subsets. Each subset of the plurality of subsets includes one or more computer trace records of the plurality of computer trace records that are included in a respective trace that is generated by a respective distributed processing system of the plurality of distributed processing systems. One or more second records of the plurality of computer trace records are categorized, using at least one of the one or more processors, into an effect category based on each second record indicating an effect event that is caused by a cause event. One or more third records of the plurality of computer trace records are categorized, using at least one of the one or more processors, into a normal category based on each third record indicating a normal event that is not a cause event and that is not an effect event. In a non-runtime context of the processor-based system, each first record from the cause category is correlated, using at least one of the one or more processors, with each second record from the effect category that indicates an effect event that is caused by a cause event that is indicated by the respective first record based on one or more criteria to establish the accurate causality order of the plurality of computer trace records. In the non-runtime context of the processor-based system, the aggregated trace is generated, using at least one of the one or more processors, to include the plurality of computer trace records in accordance with the accurate causality order.

In a first aspect of the second example method, each first record of the one or more first records is generated before occurrence of the cause event that is indicated by the respective first record.

In a second aspect of the second example method, the first example method further comprises assigning one or more identifiers to the one or more respective first records. Each identifier uniquely identifies the first record to which the identifier is assigned. In accordance with the second aspect, in the non-runtime context of the processor-based system, correlating each first record with each second record that is caused by the respective first record comprises, in the non-runtime context of the processor-based system, correlating each first record with each second record that indicates an effect event that is caused by a cause event that is indicated by the respective first record based on each second record that indicates an effect event that is caused by a cause event that is indicated by the respective first record being associated with the respective identifier of the one or more identifiers. The second aspect of the second example method may be implemented in combination with the first aspect of the second example method, though the example embodiments are not limited in this respect.

In a third aspect of the second example method, a designated first record of the one or more first records indicates that a specified message is sent. In accordance with the third aspect, a designated second record of the one or more second records indicates that the specified message is received. In further accordance with the third aspect, the second example method further comprises assigning a message identifier to the specified message. In further accordance with the third aspect, in the non-runtime context of the processor-based system, correlating each first record with each second record that indicates an effect event that is caused by a cause event that is indicated by the respective first record comprises, in the non-runtime context of the processor-based system, correlating the designated first record with the designated second record based on the message identifier being assigned to the specified message. The third aspect of the second example method may be implemented in combination with the first and/or second aspect of the second example method, though the example embodiments are not limited in this respect.

In a fourth aspect of the second example method, a designated first record of the one or more first records indicates that a first timer is expired. In accordance with the fourth aspect, a designated second record of the one or more second records indicates that a second timer, which is related to the first timer, is started. In further accordance with the fourth aspect, in the non-runtime context of the processor-based system, correlating each first record with each second record that indicates an effect event that is caused by a cause event that is indicated by the respective first record comprises, in the non-runtime context of the processor-based system, correlating the designated first record with the designated second record based on the first timer being related to the second timer. The fourth aspect of the second example method may be implemented in combination with the first, second, and/or third aspect of the second example method, though the example embodiments are not limited in this respect.

In a fifth aspect of the second example method, a designated first record of the one or more first records indicates that specified data is written to a store that is external to the distributed processing system that generated the designated first record. In accordance with the fifth aspect, a designated second record of the one or more second records indicates that the specified data is read from the store. In further accordance with the fifth aspect, in the non-runtime context of the processor-based system, correlating each first record with each second record that indicates an effect event that is caused by a cause event that is indicated by the respective first record comprises, in the non-runtime context of the processor-based system, correlating the designated first record with the designated second record based on the one or more criteria. The fifth aspect of the second example method may be implemented in combination with the first, second, third, and/or fourth aspect of the second example method, though the example embodiments are not limited in this respect.

In a sixth aspect of the second example method, generating the aggregated trace comprises outputting each third record of the one or more third records into the aggregated trace. In accordance with the sixth aspect, generating the aggregated trace further comprises outputting each first record of the one or more first records into the aggregated trace. In further accordance with the sixth aspect, the first example method further comprises assigning each first record of the one or more first records to a pending cause list. In further accordance with the sixth aspect, the first example method further comprises, for each third record of the one or more third records, determining whether a designated condition is satisfied. In further accordance with the sixth aspect, the designated condition is that each first record that indicates a cause event that causes an effect that is indicated by the third record is assigned to the pending cause list. In further accordance with the sixth aspect, generating the aggregated trace comprises, for each third record, performing a first operation or a second operation depending on whether the designated condition is satisfied. In further accordance with the sixth aspect, the first operation comprises, in response to the designated condition being satisfied, outputting the third record into the aggregated trace and removing each first record that indicates a cause event that causes the effect that is indicated by the third record from the pending cause list. In further accordance with the sixth aspect, the second operation comprises, in response to the designated condition not being satisfied, delaying output of the third record into the aggregated trace until the designated condition is satisfied.

In an example of the sixth aspect of the second example method, the second operation further comprises, in response to the designated condition not being satisfied, delaying output of other computer trace records in the subset that includes the third record into the aggregated trace until the designated condition is satisfied.

The sixth aspect of the second example method may be implemented in combination with the first, second, third, fourth, and/or fifth aspect of the second example method, though the example embodiments are not limited in this respect.

A first example processor-based system to establish an accurate causality order of a plurality of computer trace records, which correspond to a plurality of respective events that occur with regard to execution of a computer program, in an aggregated trace, comprises one or more processors, identification logic, correlation logic, and generation logic. The identification logic, which is implemented using at least one of the one or more processors, is configured to identify one or more first records of the plurality of computer trace records to be one or more respective cause records. Each cause record indicates a cause event that causes an effect event. The plurality of computer trace records includes a plurality of subsets. Each subset of the plurality of subsets includes one or more computer trace records of the plurality of computer trace records that are included in a respective trace that is generated by a respective processing system of a plurality of distributed processing systems. The identification logic is further configured to identify one or more second records of the plurality of computer trace records to be one or more respective effect records. Each effect record indicates an effect event that is caused by a cause event. The identification logic is further configured to identify one or more third records of the plurality of computer trace records to be one or more respective normal records. Each normal record indicates a normal event that is not a cause event and that is not an effect event. The correlation logic, which is implemented using at least one of the one or more processors, is configured to, in a non-runtime context of the processor-based system, correlate each cause record of the one or more cause records with each effect record of the one or more effect records that indicates an effect event that is caused by a cause event that is indicated by the respective cause record based on one or more criteria to establish the accurate causality order of the plurality of computer trace records. The generation logic, which is implemented using at least one of the one or more processors, is configured to, in the non-runtime context of the processor-based system, generate the aggregated trace to include the plurality of computer trace records in accordance with the accurate causality order.

In a first aspect of the first example processor-based system, each cause record of the one or more cause records is generated before occurrence of the cause event that is indicated by the respective cause record.

In a second aspect of the first example processor-based system, the first example processor-based system further comprises assignment logic, which implemented using at least one of the one or more processors, configured to assign one or more identifiers to the one or more respective cause records. Each identifier uniquely identifies the cause record to which the identifier is assigned. In accordance with the second aspect, the correlation logic is configured to, in the non-runtime context of the processor-based system, correlate each cause record of the one or more cause records with each effect record of the one or more effect records that indicates an effect event that is caused by a cause event that is indicated by the respective cause record based on each effect record of the one or more effect records that indicates an effect event that is caused by a cause event that is indicated by the respective cause record being associated with the respective identifier of the one or more identifiers. The second aspect of the first example processor-based system may be implemented in combination with the first aspect of the first example processor-based system, though the example embodiments are not limited in this respect.

In a third aspect of the first example processor-based system, a first cause record of the one or more cause records indicates that a specified message is sent. In accordance with the third aspect, a first effect record of the one or more effect records indicates that the specified message is received. In further accordance with the third aspect, the first example processor-based system further comprises assignment logic, implemented using at least one of the one or more processors, configured to assign a message identifier to the specified message. In further accordance with the third aspect, the correlation logic is configured to, in the non-runtime context of the processor-based system, correlate the first cause record with the first effect record based on the message identifier being assigned to the specified message. The third aspect of the first example processor-based system may be implemented in combination with the first and/or second aspect of the first example processor-based system, though the example embodiments are not limited in this respect.

In a fourth aspect of the first example processor-based system, a designated cause record of the one or more cause records indicates that a first timer is expired. In accordance with the fourth aspect, a designated effect record of the one or more effect records indicates that a second timer, which is related to the first timer, is started. In further accordance with the fourth aspect, the correlation logic is configured to, in the non-runtime context of the processor-based system, correlate the designated cause record with the designated effect record based on the first timer being related to the second timer. The fourth aspect of the first example processor-based system may be implemented in combination with the first, second, and/or third aspect of the first example processor-based system, though the example embodiments are not limited in this respect.

In a fifth aspect of the first example processor-based system, a designated cause record of the one or more cause records indicates that specified data is written to a store that is external to the processing system that generated the designated cause record. In accordance with the fifth aspect, a designated effect record of the one or more effect records indicates that the specified data is read from the store. In further accordance with the fifth aspect, the correlation logic is configured to, in the non-runtime context of the processor-based system, correlate the designated cause record with the designated effect record based on the one or more criteria. The fifth aspect of the first example processor-based system may be implemented in combination with the first, second, third, and/or fourth aspect of the first example processor-based system, though the example embodiments are not limited in this respect.

In a sixth aspect of the first example processor-based system, the generation logic is configured to output each computer trace record of the plurality of computer trace records that is identified as a normal record into the aggregated trace. In accordance with the sixth aspect, the generation logic is configured to output each computer trace record of the plurality of computer trace records that is identified as a cause record into the aggregated trace. In further accordance with the sixth aspect, the generation logic is configured to assign each computer trace record of the plurality of computer trace records that is identified as a cause record to a pending cause list. In further accordance with the sixth aspect, the first example processor-based system further comprises determination logic configured to, for each computer trace record of the plurality of computer trace records that is identified as an effect record, determine whether a designated condition is satisfied. In accordance with the sixth aspect, the designated condition is that each cause record that indicates a cause event that causes an effect that is indicated by the effect record is assigned to the pending cause list. In further accordance with the sixth aspect, the generation logic is configured to, for each computer trace record of the plurality of computer trace records that is identified as an effect record, perform a first operation or a second operation depending on whether the designated condition is satisfied. In further accordance with the sixth aspect, the first operation is configured to, in response to the designated condition being satisfied, output the effect record into the aggregated trace and remove each cause record that indicates a cause event that causes the effect that is indicated by the effect record from the pending cause list. In further accordance with the sixth aspect, the second operation is configured to, in response to the designated condition not being satisfied, delay outputting the effect record into the aggregated trace until the designated condition is satisfied.

In an example of the sixth aspect of the first example processor-based system, the second operation is further configured to, in response to the designated condition not being satisfied, delay output of other computer trace records in the subset that includes the effect record into the aggregated trace until the designated condition is satisfied.

The sixth aspect of the first example processor-based system may be implemented in combination with the first, second, third, fourth, and/or fifth aspect of the first example processor-based system, though the example embodiments are not limited in this respect.

A second example processor-based system to establish an accurate causality order of a plurality of computer trace records, which are associated with a computer program, in an aggregated trace, comprises one or more processors, categorization logic, correlation logic, and generation logic. The categorization logic, which is implemented using at least one of the one or more processors, is configured to categorize one or more first records of the plurality of computer trace records into a cause category based on each first record indicating a cause event that causes an effect event. The plurality of computer trace records includes a plurality of subsets. Each subset of the plurality of subsets includes one or more computer trace records of the plurality of computer trace records that are included in a respective trace that is generated by a respective distributed processing system of the plurality of distributed processing systems. The categorization logic is further configured to categorize one or more second records of the plurality of computer trace records into an effect category based on each second record indicating an effect event that is caused by a cause event. The categorization logic is further configured to categorize one or more third records of the plurality of computer trace records into a normal category based on each third record indicating a normal event that is not a cause event and that is not an effect event. The correlation logic, which is implemented using at least one of the one or more processors, is configured to, in a non-runtime context of the processor-based system, correlate each first record from the cause category with each second record from the effect category that indicates an effect event that is caused by a cause event that is indicated by the respective first record based on one or more criteria to establish the accurate causality order of the plurality of computer trace records. The generation logic, which is implemented using at least one of the one or more processors, is configured to, in the non-runtime context of the processor-based system, generate the aggregated trace to include the plurality of computer trace records in accordance with the accurate causality order.

In a first aspect of the second example processor-based system, each first record of the one or more first records is generated before occurrence of the cause event that is indicated by the respective first record.

In a second aspect of the second example processor-based system, the second example processor-based system further comprises assignment logic, implemented using at least one of the one or more processors, configured to assign one or more identifiers to the one or more respective first records. In accordance with the second aspect, each identifier uniquely identifies the first record to which the identifier is assigned. In further accordance with the second aspect, the correlation logic is configured to, in the non-runtime context of the processor-based system, correlate each first record with each second record that indicates an effect event that is caused by a cause event that is indicated by the respective first record based on each second record that indicates an effect event that is caused by a cause event that is indicated by the respective first record being associated with the respective identifier of the one or more identifiers. The second aspect of the second example processor-based system may be implemented in combination with the first aspect of the second example processor-based system, though the example embodiments are not limited in this respect.

In a third aspect of the second example processor-based system, a designated first record of the one or more first records indicates that a specified message is sent. In accordance with the third aspect, a designated second record of the one or more second records indicates that the specified message is received. In further accordance with the third aspect, the second example processor-based system further comprises assignment logic, implemented using at least one of the one or more processors, configured to assign a message identifier to the specified message. In further accordance with the third aspect, the correlation logic is configured to, in the non-runtime context of the processor-based system, correlate the designated first record with the designated second record based on the message identifier being assigned to the specified message. The third aspect of the second example processor-based system may be implemented in combination with the first and/or second aspect of the second example processor-based system, though the example embodiments are not limited in this respect.

In a fourth aspect of the second example processor-based system, a designated first record of the one or more first records indicates that a first timer is expired. In accordance with the fourth aspect, a designated second record of the one or more second records indicates that a second timer, which is related to the first timer, is started. In further accordance with the fourth aspect, the correlation logic is configured to, in the non-runtime context of the processor-based system, correlate the designated first record with the designated second record based on the first timer being related to the second timer. The fourth aspect of the second example processor-based system may be implemented in combination with the first, second, and/or third aspect of the second example processor-based system, though the example embodiments are not limited in this respect.

In a fifth aspect of the second example processor-based system, a designated first record of the one or more first records indicates that specified data is written to a store that is external to the distributed processing system that generated the designated first record. In accordance with the fifth aspect, a designated second record of the one or more second records indicates that the specified data is read from the store. In further accordance with the fifth aspect, the correlation logic is configured to, in the non-runtime context of the processor-based system, correlate the designated first record with the designated second record based on the one or more criteria. The fifth aspect of the second example processor-based system may be implemented in combination with the first, second, third, and/or fourth aspect of the second example processor-based system, though the example embodiments are not limited in this respect.

In a sixth aspect of the second example processor-based system, the generation logic is configured to output each third record of the one or more third records into the aggregated trace. In accordance with the sixth aspect, the generation logic is configured to output each first record of the one or more first records into the aggregated trace. In further accordance with the sixth aspect, the second example processor-based system further comprises assignment logic, implemented using at least one of the one or more processors, configured to assign each first record of the one or more first records to a pending cause list. In further accordance with the sixth aspect, the second example processor-based system further comprises determination logic, implemented using at least one of the one or more processors, configured to, for each third record of the one or more third records, determine whether a designated condition is satisfied. In further accordance with the sixth aspect, the designated condition is that each first record that indicates a cause event that causes an effect that is indicated by the third record is assigned to the pending cause list. In further accordance with the sixth aspect, the generation logic is configured to, for each third record, perform a first operation or a second operation depending on whether the designated condition is satisfied. In further accordance with the sixth aspect, the first operation is configured to, in response to the designated condition being satisfied, output the third record into the aggregated trace and remove each first record that indicates a cause event that causes the effect that is indicated by the third record from the pending cause list. In further accordance with the sixth aspect, the second operation is configured to, in response to the designated condition not being satisfied, delay output of the third record into the aggregated trace until the designated condition is satisfied.

In an example of the sixth aspect of the second example processor-based system, the second operation is further configured to, in response to the designated condition not being satisfied, delay output of other computer trace records in the subset that includes the third record into the aggregated trace until the designated condition is satisfied.

The sixth aspect of the second example processor-based system may be implemented in combination with the first, second, third, fourth, and/or fifth aspect of the second example processor-based system, though the example embodiments are not limited in this respect.

A first example computer program product comprises a computer-readable storage medium having computer program logic recorded thereon for enabling a processor-based system to establish an accurate causality order of a plurality of computer trace records, which correspond to a plurality of respective events that occur with regard to execution of a computer program, in an aggregated trace. The computer program logic comprises first program logic, second program logic, and third program logic. The first program logic is for enabling the processor-based system to identify one or more first records of the plurality of computer trace records to be one or more respective cause records. Each cause record indicates a cause event that causes an effect event. The plurality of computer trace records includes a plurality of subsets. Each subset of the plurality of subsets includes one or more computer trace records of the plurality of computer trace records that are included in a respective trace that is generated by a respective processing system of a plurality of distributed processing systems. The first program logic is further for enabling the processor-based system to identify one or more second records of the plurality of computer trace records to be one or more respective effect records. Each effect record indicates an effect event that is caused by a cause event. The first program logic is further for enabling the processor-based system to identify one or more third records of the plurality of computer trace records to be one or more respective normal records. Each normal record indicates a normal event that is not a cause event and that is not an effect event. The second program logic is for enabling the processor-based system to, in a non-runtime context of the processor-based system, correlate each cause record of the one or more cause records with each effect record of the one or more effect records that indicates an effect event that is caused by a cause event that is indicated by the respective cause record based on one or more criteria to establish the accurate causality order of the plurality of computer trace records. The third program logic is for enabling the processor-based system to, in the non-runtime context of the processor-based system, generate the aggregated trace to include the plurality of computer trace records in accordance with the accurate causality order.

A second example computer program product comprises a computer-readable storage medium having computer program logic recorded thereon for enabling a processor-based system to establish an accurate causality order of a plurality of computer trace records, which are associated with a computer program, in an aggregated trace. The computer program logic comprises first program logic, second program logic, and third program logic. The first program logic is for enabling the processor-based system to categorize one or more first records of the plurality of computer trace records into a cause category based on each first record indicating a cause event that causes an effect event. The plurality of computer trace records includes a plurality of subsets. Each subset of the plurality of subsets includes one or more computer trace records of the plurality of computer trace records that are included in a respective trace that is generated by a respective distributed processing system of the plurality of distributed processing systems. The first program logic is further for enabling the processor-based system to categorize one or more second records of the plurality of computer trace records into an effect category based on each second record indicating an effect event that is caused by a cause event. The first program logic is further for enabling the processor-based system to categorize one or more third records of the plurality of computer trace records into a normal category based on each third record indicating a normal event that is not a cause event and that is not an effect event. The second program logic is for enabling the processor-based system to, in a non-runtime context of the processor-based system, correlate each first record from the cause category with each second record from the effect category that indicates an effect event that is caused by a cause event that is indicated by the respective first record based on one or more criteria to establish the accurate causality order of the plurality of computer trace records. The third program logic is for enabling the processor-based system to, in the non-runtime context of the processor-based system, generate the aggregated trace to include the plurality of computer trace records in accordance with the accurate causality order.

IV. Example Computer System

Figure 7:
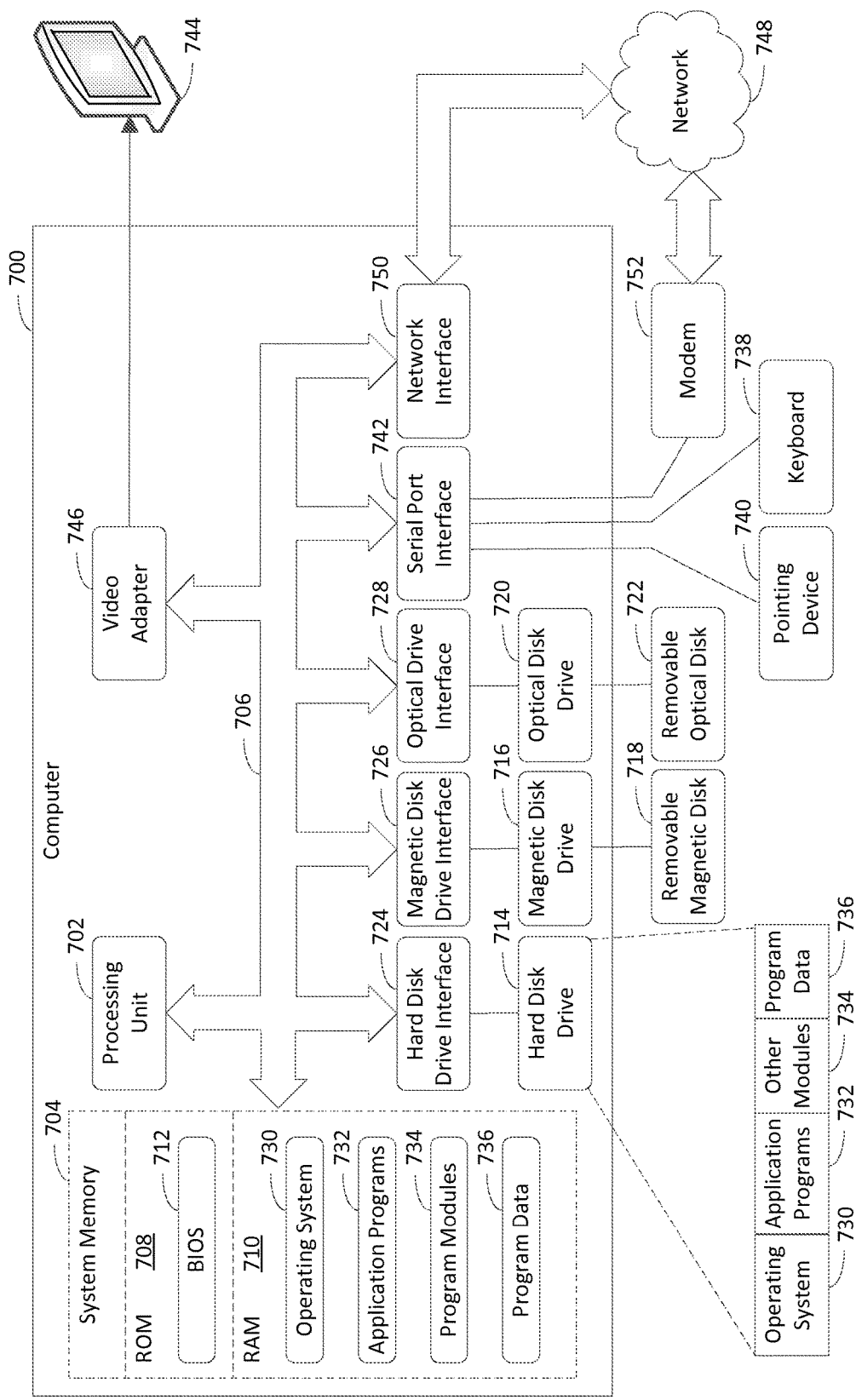
FIG. 7 depicts an example computer in which embodiments may be implemented.

FIG. 7 depicts an example computer 700 in which embodiments may be implemented. Any one or more of client devices 102A-102M, any one or more of servers 106A-106N, and/or machine 108 shown in FIG. 1; and/or identification logic 602, assignment logic 604, correlation logic 606, generation logic 608, non-runtime trace record order logic 610, store 612, and/or determination logic 614 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of identification logic 602, assignment logic 604, correlation logic 606, generation logic 608, non-runtime trace record order logic 610, determination logic 614, flowchart 200 (including any step of flowchart 200), flowchart 300 (including any step of flowchart 300), flowchart 400 (including any step of flowchart 400), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A processor-based system to establish an accurate causality order of a plurality of computer trace records, which correspond to a plurality of respective events that occur with regard to execution of a computer program, in an aggregated trace, the processor-based system comprising:
one or more processors;
identification logic implemented using at least one of the one or more processors and configured to identify one or more first records of the plurality of computer trace records to be one or more respective cause records, wherein each cause record indicating a cause event that causes an effect event, wherein the plurality of computer trace records including a plurality of subsets, wherein each subset of the plurality of subsets including one or more computer trace records of the plurality of computer trace records that are included in a respective trace that is generated by a respective processing system of a plurality of distributed processing systems,
wherein the identification logic is further configured to identify one or more second records of the plurality of computer trace records to be one or more respective effect records, wherein each effect record indicates an effect event that is caused by a cause event,
wherein the identification logic is further configured to identify one or more third records of the plurality of computer trace records to be one or more respective normal records, and wherein each normal record indicating a normal event that is not a cause event and that is not an effect event;
correlation logic implemented using at least one of the one or more processors and configured to, in a non-runtime context of the processor-based system, correlate each cause record of the one or more cause records with each effect record of the one or more effect records that indicates an effect event caused by a cause event indicated by the respective cause record based on one or more criteria to establish the accurate causality order of the plurality of computer trace records; and
generation logic implemented using at least one of the one or more processors and configured to, in the non-runtime context of the processor-based system, generate the aggregated trace to include the plurality of computer trace records in accordance with the accurate causality order,
wherein each cause record of the one or more cause records is generated before occurrence of the cause event that is indicated by the respective cause record.

2. The processor-based system of claim 1, further comprising:
assignment logic implemented using at least one of the one or more processors and configured to assign one or more identifiers to the one or more respective cause records, wherein each identifier uniquely identifies the cause record to which the identifier is assigned, and
wherein the correlation logic is configured to, in the non-runtime context of the processor-based system, correlate each cause record of the one or more cause records with each effect record of the one or more effect records that indicates an effect event caused by a cause event indicated by the respective cause record based on each effect record of the one or more effect records indicating an effect event caused by a cause event indicated by the respective cause record being associated with the respective identifier of the one or more identifiers.

3. The processor-based system of claim 1, wherein:
a first cause record of the one or more cause records indicates that a specified message is sent;
a first effect record of the one or more effect records indicates that the specified message is received;
the processor-based system further comprises assignment logic, implemented using at least one of the one or more processors, configured to assign a message identifier to the specified message; and
the correlation logic is configured to, in the non-runtime context of the processor-based system, correlate the first cause record with the first effect record based on the message identifier being assigned to the specified message.

4. The processor-based system of claim 1, wherein:
a designated cause record of the one or more cause records indicates that a first timer is expired;
a designated effect record of the one or more effect records indicates that a second timer, which is related to the first timer, is started; and
the correlation logic is configured to, in the non-runtime context of the processor-based system, correlate the designated cause record with the designated effect record based on the first timer being related to the second timer.

5. The processor-based system of claim 1, wherein:
a designated cause record of the one or more cause records indicates that specified data is written to a store that is external to the processing system that generated the designated cause record;
a designated effect record of the one or more effect records indicates that the specified data is read from the store; and
the correlation logic is configured to, in the non-runtime context of the processor-based system, correlate the designated cause record with the designated effect record based on the one or more criteria.

6. The processor-based system of claim 1, wherein:
the generation logic is configured to output each computer trace record of the plurality of computer trace records that is identified as a normal record into the aggregated trace;
the generation logic is configured to output each computer trace record of the plurality of computer trace records that is identified as a cause record into the aggregated trace;
the generation logic is configured to assign each computer trace record of the plurality of computer trace records that is identified as a cause record to a pending cause list;
the processor-based system further comprises determination logic configured to, for each computer trace record of the plurality of computer trace records that is identified as an effect record, determine whether a designated condition is satisfied, wherein the designated condition is each cause record indicating a cause event that causes an effect indicated by the effect record is assigned to the pending cause list;
the generation logic is configured to, for each computer trace record of the plurality of computer trace records that is identified as an effect record, perform a first operation or a second operation depending on whether the designated condition is satisfied;
the first operation configured to, in response to the designated condition being satisfied, output the effect record into the aggregated trace and remove each cause record that indicates a cause event that causes the effect indicated by the effect record from the pending cause list; and
the second operation configured to, in response to the designated condition not being satisfied, delay outputting the effect record into the aggregated trace until the designated condition is satisfied.

7. The processor-based system of claim 6, wherein the second operation is further configured to, in response to the designated condition not being satisfied, delay output of other computer trace records in the subset that includes the effect record into the aggregated trace until the designated condition is satisfied.

8. A method of establishing an accurate causality order of a plurality of computer trace records, which correspond to a plurality of respective events that occur with regard to execution of a computer program, in an aggregated trace using one or more processors of a processor-based system coupled to a plurality of distributed processing systems via a network, the method comprising:

identifying, using at least one of the one or more processors, one or more first records of the plurality of computer trace records to be one or more respective cause records, wherein each cause record indicates a cause event that causes an effect event, wherein the plurality of computer trace records includes a plurality of subsets, and wherein each subset of the plurality of subsets including one or more computer trace records of the plurality of computer trace records that are included in a respective trace generated by a respective processing system of the plurality of distributed processing systems;

identifying, using at least one of the one or more processors, one or more second records of the plurality of computer trace records to be one or more respective effect records, wherein each effect record indicates an effect event that is caused by a cause event;

identifying, using at least one of the one or more processors, one or more third records of the plurality of computer trace records to be one or more respective normal records, wherein each normal record indicates a normal event that is not a cause event and that is not an effect event;

in a non-runtime context of the processor-based system, correlating, using at least one of the one or more processors, each cause record of the one or more cause records with each effect record of the one or more effect records that indicates an effect event caused by a cause event indicated by the respective cause record based on one or more criteria to establish the accurate causality order of the plurality of computer trace records; and in the non-runtime context of the processor-based system, generating, using at least one of the one or more processors, the aggregated trace to include the plurality of computer trace records in accordance with the accurate causality order, wherein a designated cause record of the one or more cause records indicates that a first timer is expired;

a designated effect record of the one or more effect records indicates that a second timer, which is related to the first timer, is started; and in the non-runtime context of the processor-based system, correlating each cause record of the one or more cause records with each effect record of the one or more effect records that indicates an effect event caused by a cause event indicated by the respective cause record, and correlating the designated cause record with the designated effect record based on the first timer being related to the second timer.

9. The method of claim 8, wherein each cause record of the one or more cause records is generated before occurrence of the cause event that is indicated by the respective cause record.

10. The method of claim 8, further comprising assigning one or more identifiers to the one or more respective cause records, wherein:

each identifier uniquely identifies the cause record to which the identifier is assigned; and in the non-runtime context of the processor-based system, correlating each cause record of the one or more cause records with each effect record of the one or more effect records that is caused by the respective cause record, and correlating each cause record of the one or more cause records with each effect record of the one or more effect records that indicates an effect event caused by a cause event indicated by the respective cause record based on each effect record of the one or more effect records indicating an effect event caused by a cause event indicated by the respective cause record being associated with the respective identifier of the one or more identifiers.

11. The method of claim 8, wherein:

a first cause record of the one or more cause records indicates that a specified message is sent;

a first effect record of the one or more effect records indicates that the specified message is received;

the method further comprises assigning a message identifier to the specified message; and in the non-runtime context of the processor-based system, correlating each cause record of the one or more cause records with each effect record of the one or more effect records that indicates an effect event caused by a cause event indicated by the respective cause record, and correlating the first cause record with the first effect record based on the message identifier being assigned to the specified message.

12. The method of claim 8, wherein:

a designated cause record of the one or more cause records indicating specified data is written to a store external to the processing system that generated the designated cause record;

a designated effect record of the one or more effect records indicates that the specified data is read from the store; and in the non-runtime context of the processor-based system, correlating each cause record of the one or more cause records with each effect record of the one or more effect records that indicates an effect event caused by a cause event indicated by the respective cause record, and correlating the designated cause record with the designated effect record based on the one or more criteria.

13. The method of claim 8, wherein generating the aggregated trace comprises:

outputting each computer trace record of the plurality of computer trace records that is identified as a normal record into the aggregated trace; and outputting each computer trace record of the plurality of computer trace records that is identified as a cause record into the aggregated trace;

wherein the method further comprises assigning each computer trace record of the plurality of computer trace records that is identified as a cause record to a pending cause list; and for each computer trace record of the plurality of computer trace records that is identified as an effect record, determining whether a designated condition is satisfied, wherein the designated condition is each cause record indicating a cause event that causes an effect indicated by the effect record is assigned to the pending cause list, and wherein
generating the aggregated trace comprises, for each computer trace record of the plurality of computer trace records that is identified as an effect record, performing a first operation or a second operation depending on whether the designated condition is satisfied, the first operation comprises, in response to the designated condition being satisfied, outputting the effect record into the aggregated trace and removing each cause record indicating a cause event that causes the effect indicated by the effect record from the pending cause list, and the second operation comprises, in response to the designated condition not being satisfied, delaying output of the effect record into the aggregated trace until the designated condition is satisfied.

14. The method of claim 13, wherein the second operation further comprises, in response to the designated condition not being satisfied, delaying output of other computer trace records in the subset that includes the effect record into the aggregated trace until the designated condition is satisfied.

15. A processor-based system to establish an accurate causality order of a plurality of computer trace records, which are associated with a computer program, in an aggregated trace, the processor-based system comprising:
one or more processors;
categorization logic implemented using at least one of the one or more processors and configured to categorize one or more first records of the plurality of computer trace records into a cause category based on each first record indicating a cause event that causes an effect event, wherein the plurality of computer trace records includes a plurality of subsets, wherein each subset of the plurality of subsets includes one or more computer trace records of the plurality of computer trace records that are included in a respective trace generated by a respective distributed processing system of the plurality of distributed processing systems,
wherein the categorization logic is further configured to categorize one or more second records of the plurality of computer trace records into an effect category based on each second record indicating an effect event that is caused by a cause event, and
wherein the categorization logic is further configured to categorize one or more third records of the plurality of computer trace records into a normal category based on each third record indicating a normal event that is not a cause event and that is not an effect event;
correlation logic implemented using at least one of the one or more processors and configured to, in a non-runtime context of the processor-based system, correlate each first record from the cause category with each second record from the effect category that indicates an effect event caused by a cause event indicated by the respective first record based on one or more criteria to establish the accurate causality order of the plurality of computer trace records; and
generation logic implemented using at least one of the one or more processors and configured to, in the non-runtime context of the processor-based system, generate the aggregated trace to include the plurality of computer trace records in accordance with the accurate causality order, wherein
the generation logic is configured to output each third record of the one or more third records into the aggregated trace,
the generation logic is configured to output each first record of the one or more first records into the aggregated trace,
the processor-based system further comprises
assignment logic implemented using at least one of the one or more processors and configured to assign each first record of the one or more first records to a pending cause list, and
determination logic implemented using at least one of the one or more processors and configured to, for each third record of the one or more third records, determine whether a designated condition is satisfied, wherein the designated condition is each first record indicating a cause event that causes an effect indicated by the third record is assigned to the pending cause list,
the generation logic is configured to, for each third record, perform a first operation or a second operation depending on whether the designated condition is satisfied,
the first operation includes, in response to the designated condition being satisfied, outputting the third record into the aggregated trace and removing each first record indicating a cause event that causes the effect indicated by the third record from the pending cause list, and
the second operation includes, in response to the designated condition not being satisfied, delaying output of the third record into the aggregated trace until the designated condition is satisfied.

16. The processor-based system of claim 15, further comprising assignment logic, implemented using at least one of the one or more processors, configured to assign one or more identifiers to the one or more respective first records, wherein:
each identifier uniquely identifies the first record to which the identifier is assigned, and
the correlation logic is configured to, in the non-runtime context of the processor-based system, correlate each first record with each second record that indicates an effect event caused by a cause event indicated by the respective first record based on each second record indicating an effect event caused by a cause event indicated by the respective first record being associated with the respective identifier of the one or more identifiers.

17. The processor-based system of claim 15, wherein the second operation is further configured to, in response to the designated condition not being satisfied, delay output of other computer trace records in the subset that includes the third record into the aggregated trace until the designated condition is satisfied.

* * * * *